(12) United States Patent
Matsumoto et al.

(10) Patent No.: US 10,767,513 B2
(45) Date of Patent: Sep. 8, 2020

(54) THERMAL ELECTRIC POWER GENERATOR

(71) Applicant: Panasonic Intellectual Property Management Co., Ltd., Osaka (JP)

(72) Inventors: Subaru Matsumoto, Tochigi (JP); Osao Kido, Kyoto (JP); Atsuo Okaichi, Osaka (JP); Takumi Hikichi, Osaka (JP); Osamu Kosuda, Osaka (JP); Noriyoshi Nishiyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 104 days.

(21) Appl. No.: 14/929,412

(22) Filed: Nov. 2, 2015

(65) Prior Publication Data
US 2016/0186616 A1    Jun. 30, 2016

(30) Foreign Application Priority Data

Dec. 25, 2014  (JP) ................................. 2014-263505

(51) Int. Cl.
*F01K 19/00*     (2006.01)
*F22B 37/42*     (2006.01)
(Continued)

(52) U.S. Cl.
CPC .............. *F01K 19/00* (2013.01); *F01K 9/003* (2013.01); *F01K 13/003* (2013.01); *F01K 13/02* (2013.01);
(Continued)

(58) Field of Classification Search
CPC ........ F01K 13/003; F01K 13/02; F01K 19/00; F01K 25/08; F01K 9/003; F22B 1/167; F22B 37/42; H02K 7/18
See application file for complete search history.

(56) References Cited

U.S. PATENT DOCUMENTS 8,181,463 B2 *  5/2012  Batscha ................. F01K 23/04
                                                         60/651
9,328,632 B2 *  5/2016  Nagai ..................... F01K 23/10
(Continued)

FOREIGN PATENT DOCUMENTS

CN          102383936          3/2012
CN          104234762          12/2014
(Continued)

OTHER PUBLICATIONS

English Translation of Chinese Search Report dated Dec. 2, 2016 for the related Chinese Patent Application No. 201510657231.4.
(Continued)

*Primary Examiner* — Matthew T Largi
(74) *Attorney, Agent, or Firm* — McDermott Will & Emery LLP

(57) ABSTRACT

A thermal electric power generator includes an evaporator, an expander, an electric generator, a condenser, and a pump. A working fluid used in the thermal electric power generator is an organic working fluid. The evaporator includes a heat exchanger, a bypass channel, and a flow rate adjustment mechanism. The bypass channel allows a heat medium to bypass the heat exchanger. The flow rate adjustment mechanism adjusts a flow rate of the heat medium to be supplied to the heat exchanger and a flow rate of the heat medium to be supplied to the bypass channel.

18 Claims, 7 Drawing Sheets

(51) Int. Cl.
*F22B 1/16* (2006.01)
*F01K 13/02* (2006.01)
*F01K 9/00* (2006.01)
*F01K 13/00* (2006.01)
*F01K 25/08* (2006.01)
*H02K 7/18* (2006.01)

(52) U.S. Cl.
CPC .............. *F01K 25/08* (2013.01); *F22B 1/167* (2013.01); *F22B 37/42* (2013.01); *H02K 7/18* (2013.01); *Y02E 20/12* (2013.01)

(56) References Cited

U.S. PATENT DOCUMENTS

| 2004/0068989 | A1* | 4/2004 | Wantanabe | F02G 5/02 |
| | | | | 60/670 |
| 2005/0183421 | A1* | 8/2005 | Vaynberg | F01K 25/08 |
| | | | | 60/641.8 |
| 2005/0268594 | A1 | 12/2005 | Kurihara et al. | |
| 2010/0307155 | A1* | 12/2010 | Kasuya | F01K 23/065 |
| | | | | 60/666 |
| 2012/0000200 | A1* | 1/2012 | Freund | F01K 23/10 |
| | | | | 60/645 |
| 2012/0047889 | A1* | 3/2012 | Ulas Acikgoz | F01K 23/064 |
| | | | | 60/649 |
| 2012/0261090 | A1* | 10/2012 | Durmaz | F01K 13/02 |
| | | | | 165/11.1 |
| 2014/0224469 | A1 | 8/2014 | Mirmobin et al. | |

FOREIGN PATENT DOCUMENTS

| DE | 102010056516 | 7/2012 |
| EP | 2402567 | 1/2012 |
| JP | 2012-013410 A | 1/2012 |
| JP | 2013-007370 | 1/2013 |
| JP | 2013-057264 | 3/2013 |

OTHER PUBLICATIONS

The Extended European Search Report dated May 2, 2016 for the related European Patent Application No. 15194033.5.

* cited by examiner

THERMAL ELECTRIC POWER GENERATOR

BACKGROUND

1. Technical Field

The present disclosure relates to a thermal electric power generator.

2. Description of the Related Art

As is well known to those skilled in the art, the rankine cycle is a theoretical cycle for steam turbines. The rankine cycle has been studied and developed for a long time. A waste heat power generator has also been studied and developed as described in Japanese Unexamined Patent Application Publication No. 2013-7370. The waste heat power generator recovers waste heat energy released from a facility such as a plant or a firing furnace to generate electric power.

In the waste heat power generator described in Japanese Unexamined Patent Application Publication No. 2013-7370, an evaporator recovers thermal energy from a waste heat medium, and the recovered thermal energy evaporates a working fluid in the rankine cycle. The evaporated working fluid activates a turbine electric generator. The working fluid that has activated the turbine electric generator is cooled and condensed by a water-cooling condenser. The condensed working fluid is sent to the evaporator again by a pump. This enables continuous generation of electric energy from the waste heat energy. In recent years, a waste heat power generator that can be set up not only in a large-scale facility, but also in a relatively small-scale facility has attracted attention.

The waste heat power generator is forced to be stopped in an emergency situation due to a malfunction in some cases. In such a case, a predetermined control is performed to safely stop electric generation of the waste heat power generator. Japanese Unexamined Patent Application Publication No. 2013-57264, for example, describes a technique for stopping operation of a power generator immediately after a flow of the working fluid is stopped. This prevents application of a reverse thrust force to an expander, for example.

As illustrated in FIG. 7, an electric generator 200 described in Japanese Unexamined Patent Application Publication No. 2013-57264 includes an on-off valve 215, a pressure equalization channel 217, an expander bypass channel 219, and a controller 220. The pressure equalization channel 217 extends so as to connect a portion of a circulation channel 206 which is positioned between the on-off valve 215 and the evaporator 202 and a portion of the circulation channel 206 which is positioned between a screw expander 203 and a condenser 204. The expander bypass channel 219 extends so as to connect a portion of the circulation channel 206 which is positioned between the on-off valve 215 and the screw expander 203 and the portion of the circulation channel 206 which is positioned between the screw expander 203 and the condenser 204. When the electric generator 200 is shut down, the controller 220 closes the on-off valve 215, and opens an expander bypass valve 218 and a pressure equalization valve 216 after operation of a working fluid pump 205 is stopped. When operation of the electric generator 200 is started, the controller 220 opens the on-off valve 215 and closes the expander bypass valve 218 and the pressure equalization valve 216 before operation of the working fluid pump 205 is started.

The technique described in Japanese Unexamined Patent Application Publication No. 2013-57264 is designed to recover heat from a heat medium having a relatively low temperature. A safe stop of the thermal electric power generator is required not only for the thermal electric power generator that recovers heat from a heat medium having a relatively low temperature, but also for a thermal electric power generator that recovers heat from a heat medium having a high temperature of 300° C. or more.

SUMMARY

One non-limiting and exemplary embodiment provides a technique for safely stopping a thermal electric power generator in the event of a failure of the thermal electric power generator.

In one general aspect, the techniques disclosed here feature a thermal electric power generator including: an evaporator including a heat exchanger that allows heat exchange between a heat medium supplied from a heat source and a working fluid; an expander that extracts power from the working fluid heated in the evaporator; an electric power generator that converts the power extracted by the expander to electric power; a condenser that cools the working fluid having a reduced pressure reduced in the expander; and a pump that takes in the working fluid cooled by the condenser and ejects the working fluid to the evaporator, wherein the working fluid is an organic working fluid, and the evaporator includes: a bypass channel that allows the heat medium to bypass the heat exchanger; and a flow rate adjustment mechanism that adjusts a flow rate of the heat medium to be supplied to the heat exchanger and a flow rate of the heat medium to be supplied to the bypass channel.

The above-described technique enables the thermal electric power generator to stop safely by using the bypass channel and the flow rate adjustment mechanism in the event of a failure of the thermal electric power generator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
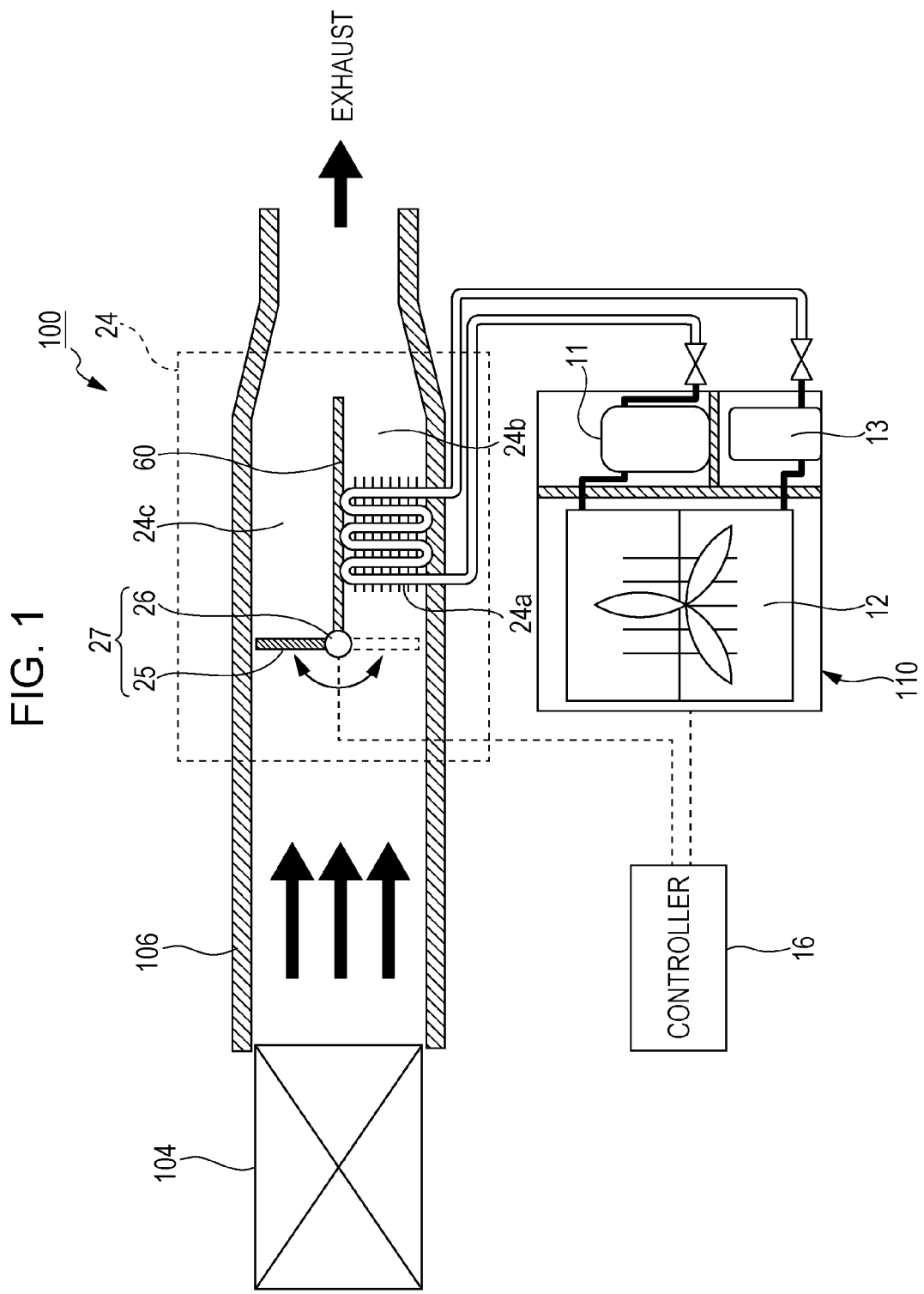
FIG. 1 is a view illustrating a configuration of a thermal electric power generator according to a first embodiment.

Heat is recovered from a heat medium discharged from a heat source such as a gas engine and an industrial furnace in some cases. In such a case, the heat medium may have a high temperature of 300° C. or more, which may be higher than a thermal decomposition temperature of the working fluid (250° C., for example) in the thermal electric power generator. In the thermal electric power generator in a normal operation, the temperature of the working fluid in an evaporator is maintained lower than the thermal decomposition temperature of the working fluid. However, in the event of a failure such as a malfunction in a component of the thermal electric power generator, the temperature of the working fluid in the evaporator may become higher than the thermal decomposition temperature of the working fluid. In other words, if a failure occurs in the thermal electric power generator and the evaporator is continuously exposed to the heat medium, the temperature of the working fluid in the evaporator may exceed the thermal decomposition temperature. In such a case, a harmful substance such as hydrogen fluoride (HF) may be generated. Such a harmful substance may leak out of the thermal electric power generator. Even if the working fluid does not leak, physical properties of the working fluid change, and thus the thermal electric power generator may have difficulty in exhibiting desired properties.

According to a first aspect of the present disclosure, a thermal electric power generator includes:
 an evaporator including a heat exchanger that allows heat exchange between a heat medium supplied from a heat source and a working fluid;
 an expander that extracts power from the working fluid heated in the evaporator;
 an electric power generator that converts the power extracted by the expander to electric power;
 a condenser that cools the working fluid having a reduced pressure reduced in the expander; and
 a pump that takes in the working fluid cooled by the condenser and ejects the working fluid to the evaporator, wherein
 the working fluid is an organic working fluid, and
 the evaporator includes: a bypass channel that allows the heat medium to bypass the heat exchanger; and a flow rate adjustment mechanism that adjusts a flow rate of the heat medium to be supplied to the heat exchanger and a flow rate of the heat medium to be supplied to the bypass channel.

In the first aspect of the present disclosure, the flow rate of the heat medium to be supplied to the heat exchanger is able to be adjusted in the event of a failure of the thermal electric power generator. In other words, the heat medium is allowed to flow through the bypass channel. This prevents the working fluid from being overheated in the heat exchanger and enables the thermal electric power generator to stop safely.

According to a second aspect of the present disclosure according to the first aspect, the thermal electric power generator in which the flow rate adjustment mechanism is disposed upstream of the heat exchanger in a flow direction of the heat medium is provided. Such positioning of the flow rate adjustment mechanism enables supply of the thermal medium to the heat exchanger to be reliably stopped.

According to a third aspect of the present disclosure according to the first or second aspect, the thermal electric power generator in which the evaporator further includes a second flow rate adjustment mechanism disposed downstream of the heat exchanger in a flow direction of the heat medium is provided. The second flow rate adjustment mechanism prevents backflow of the heat medium in which the heat medium flows from a downstream side of the heat exchanger toward the heat exchanger. As a result, unnecessary heat is unlikely to be applied to the heat exchanger. The flow rate adjustment mechanism and the second flow rate adjustment mechanism may be controlled to be closed for maintenance of the heat exchanger. The heat exchanger may be removed for maintenance.

According to a fourth aspect of the present disclosure according to any one of the first to third aspects, the thermal electric power generator further includes:
 a detector that determines an operation state of the thermal electric power generator; and
 a flow rate controller that controls the flow rate adjustment mechanism, wherein
 the flow rate controller controls the flow rate adjustment mechanism such that the supply of the heat medium to the heat exchanger is reduced or stopped if a result determined by the detector exceeds a predetermined threshold. This configuration enables the thermal electric power generator to operate in such a way that the temperature of the working fluid in the heat exchanger remains lower than a thermal decomposition temperature of the working fluid.

According to a fifth aspect of the present disclosure according to any one of the first to fourth aspects, the thermal electric power generator in which the detector determines a pressure of the working fluid at an inlet of the expander or determines a difference between a pressure of the working fluid at the inlet of the expander and a pressure of the working fluid at an outlet of the expander is provided. This configuration enables monitoring of behavior of the thermal electric power generator and reliable detection of a failure of the thermal electric power generator.

According to a sixth aspect of the present disclosure according to any one of the first to fifth aspects, the thermal electric power generator in which the detector determines a temperature of the working fluid at an inlet of the expander is provided. This configuration enables monitoring of behavior of the thermal electric power generator and reliable detection of a failure of the thermal electric power generator.

According to a seventh aspect of the present disclosure according to any one of the first to sixth aspects, the thermal electric power generator in which the detector determines an amount of electric power generated by the electric generator is provided. The generated electric power is a reliable parameter, and thus a failure of the thermal electric power generator is promptly detected by using the detector that detects the electric power.

According to an eighth aspect of the present disclosure according to any one of the first to seventh aspects, the thermal electric power generator further includes:
 an expander bypass channel that allows the working fluid to bypass the expander;
 a valve disposed in the expander bypass channel; and
 a controller that controls the valve, wherein
 the controller opens the valve such that the working fluid flows through the expander bypass channel if the thermal electric power generator is determined to have had a failure. This configuration allows the working fluid to flow through the expander bypass channel. As a result, an excess amount of the working fluid is unlikely to flow to the expander, enabling the thermal electric power generator to stop safely.

According to a ninth aspect of the present disclosure according to any one of the first to seventh aspects, the thermal electric power generator further includes:
 an expander bypass channel that allows the working fluid to bypass the expander; and a valve disposed in the expander bypass channel, wherein the valve is allowed to be open when the thermal electric power generator has a failure. This configuration reduces an increase in internal pressure of the thermal electric power generator in the event of a failure of the thermal electric power generator.

According to a tenth aspect of the present disclosure according to any one of the first to ninth aspects, the thermal electric power generator in which the heat exchanger allows direct heat exchange between the heat medium and the working fluid is provided. This configuration achieves high heat exchange efficiency compared with a configuration in which a secondary medium is used to perform the heat exchange. Thus, the thermal electric power generator generates more electric power. In addition, this configuration simplifies components of the thermal electric power generator.

According to an eleventh aspect of the present disclosure according to any one of the first to tenth aspects, the thermal electric power generator in which the condenser cools the working fluid with air. If the condenser is an air-cooling condenser, cooling water is not required, and thus accompanying equipment such as a water pipe is unnecessary. This simplifies installation work for the thermal electric power generator and also saves the trouble of maintenance.

According to a twelfth aspect of the present disclosure according to any one of the first to tenth aspects, the thermal electric power generator in which the condenser cools the working fluid with water is provided. If the condenser is a water-cooling condenser, the condensation temperature is low compared with a case in which the condenser is the air-cooling condenser. Thus, the thermal electric power generator is able to generate more electric power, resulting in high electric power generation efficiency.

According to a thirteenth aspect of the present disclosure according to any one of the first to twelfth aspects, the thermal electric power generator in which the evaporator allows the heat medium having a temperature higher than a thermal decomposition temperature of the working fluid to flow therethrough is provided. If the thermal electric power generator operates under such a condition, the amount of heat recovery increases, resulting in high electric power generation efficiency.

Hereinafter, embodiments of the present disclosure are described with reference to the drawings. The present disclosure is not limited to the embodiments.

First Embodiment

As illustrated in FIG. 1, a thermal electric power generator 100 includes an evaporator 24, an expander 11, a condenser 12, a pump 13, and a controller 16. The evaporator 24, the expander 11, the condenser 12, and the pump 13 are connected in this sequence in a loop through pipes to form a rankine cycle circuit. A heat medium having a high temperature is supplied from a heat source 104 to the thermal electric power generator 100 through a duct 106. The thermal electric power generator 100 generates electric power by using the high-temperature heat medium generated by the heat source 104.

Kinds of the heat source 104 are not limited. Kinds of the heat medium supplied from the heat source 104 to the thermal electric power generator 100 are also not limited. The heat medium having a high temperature of 100 to 500° C., for example, is generated by the heat source 104. The heat source 104 may be a furnace such as a waste incinerator, a combustion furnace, or a firing furnace, for example.

In such a case, gas having a high temperature such as an exhaust gas and combustion air is supplied as the heat medium from the heat source 104 to the thermal electric power generator 100. Alternatively, the heat source 104 may be a plant such as a steam plant. In such a case, vapor having a high temperature or a waste liquid having a high temperature is supplied from the heat source 104 to the thermal electric power generator 100. Alternatively, the heat source 104 may be a natural vapor source such as a geothermal heat source or a hot spring. In such a case, vapor having a high temperature is supplied from the heat source 104 to the thermal electric power generator 100. Alternatively, a fluid such as oil may be supplied as the heat medium to the thermal electric power generator 100.

In this embodiment, the working fluid used in the thermal electric power generator 100 is an organic working fluid. The above-described rankine cycle circuit is filled with the organic working fluid. The thermal electric power generator 100 has a configuration based on the organic rankine cycle. The organic rankine cycle readily achieves high electric power generation efficiency in a temperature range of 100 to 500° C. compared with other electric power generation methods.

Examples of the organic working fluid include a halogenated hydrocarbon, a hydrocarbon, and an alcohol. Examples of a halogenated hydrocarbon include R-123, R-245fa, and R-1234ze. Examples of a hydrocarbon include alkanes such as propane, butane, pentane, and isopentane. Examples of an alcohol include ethanol. The organic working fluid may be used alone, or two or more kinds of the organic working fluid may be used in combination. The technique disclosed herein is applicable to a thermal electric power generator that uses an inorganic working fluid such as water, carbon dioxide, and ammonia as the working fluid.

During the operation of the thermal electric power generator 100, the temperature of the heat medium around the heat exchanger 24a is higher than a thermal decomposition temperature of the working fluid, for example. In the thermal electric power generator 100 operating under such a condition, the amount of heat recovery increases, resulting in high electric power generation efficiency.

In this embodiment, a portion of the duct 106 is constituted by the evaporator 24. The evaporator 24 is an evaporator unit including the portion of the duct 106. Specifically, the evaporator 24 includes the heat exchanger 24a, a main channel 24b, and a bypass channel 24c. The heat exchanger 24a is configured to allow heat exchange between the heat medium discharged from the heat source 104 and the working fluid. The working fluid to be heated at the heat exchanger 24a of the evaporator 24 is the working fluid in the rankine cycle circuit. The working fluid receives thermal energy from the heat medium at the heat exchanger 24a and evaporates. The main channel 24b and the bypass channel 24c are flow passages extending in the duct 106. The heat exchanger 24a is disposed in the main channel 24b. The bypass channel 24c is configured to allow the heat medium to bypass the heat exchanger 24a. In this embodiment, the main channel 24b and the bypass channel 24c are separated by a wall 60.

The evaporator 24 recovers the thermal energy released from a facility such as a plant or a firing furnace through the heat medium. The evaporator 24 (particularly, the heat exchanger 24a) is designed according to conditions such as temperature, flow rate, and physical properties of the heat medium, for example. The heat exchanger 24a may be a fin tube heat exchanger. In the case where the heat source 104 is a plant and the duct 106 is a path for waste heat from the plant (exhaust duct), the heat exchanger 24a is disposed in the path for waste heat.

The heat exchanger 24a is configured to allow direct heat exchange between the heat medium and the working fluid. In other words, heat is exchanged between the heat medium and the working fluid without a secondary medium. This achieves high heat exchange efficiency compared with a configuration in which the secondary medium is used to perform the heat exchange. Thus, the thermal electric power generator 100 is able to generate more electric power. In addition, this configuration simplifies components of the thermal electric power generator 100.

The evaporator 24 further includes a flow rate adjustment mechanism 27. The flow rate adjustment mechanism 27 adjusts a flow rate of the heat medium to be supplied to the heat exchanger 24a and a flow rate of the heat medium to be supplied to the bypass channel 24c. In the event of a failure of the thermal electric power generator 100, the flow rate adjustment mechanism 27 adjusts the flow rate of the heat medium to be supplied to the heat exchanger 24a. In other words, the flow rate adjustment mechanism 27 allows the heat medium to flow through the bypass channel 24c. This prevents the working fluid from being overheated at the heat exchanger 24a and enables the thermal electric power generator 100 to stop safely.

The flow rate adjustment mechanism 27 has a function (distribution function) of adjusting a proportion of the flow rate of the heat medium at the main channel 24b to the flow rate of the heat medium at the bypass channel 24c in a stepwise manner or a continuous manner. This function enables the adjustment of the flow rate of the heat medium at each channel depending on the condition of the heat source 104 or depending on a necessary amount of electric power generation, for example. If a large amount of heat is generated at the heat source 104, some of the heat medium is allowed to flow through the main channel 24b and the remaining heat medium is allowed to flow through the bypass channel 24c. This prevents the working fluid from being overheated at the heat exchanger 24a and enables the thermal electric power generator 100 to operate stably. However, the distribution function of the flow rate adjustment mechanism 27 is an optional function. The flow rate adjustment mechanism 27 may be configured to operate in a selected one of two modes including a mode that allows the entire heat medium to flow through the main channel 24b and a mode that allows the entire heat medium to flow through the bypass channel 24c.

In this embodiment, the flow rate adjustment mechanism 27 is a damper adjustment mechanism. Specifically, the flow rate adjustment mechanism 27 includes a damper 25 and an actuator 26. The flow rate adjustment mechanism 27 is electrically controlled by the controller 16. The damper 25 is linked to the actuator 26 and moved by the actuator 26. The actuator 26 is a motor or a solenoid actuator, for example. The position of the damper 25 determines the proportion of the flow rate of the heat medium at the main channel 24b to the flow rate of the heat medium at the bypass channel 24c. The damper 25 positioned as indicated by a solid line closes the bypass channel 24c, allowing the entire heat medium to flow through the main channel 24b. The damper 25 positioned as indicated by a broken line opens the bypass channel 24c, allowing the entire heat medium to flow through the bypass channel 24c.

In this embodiment, the flow rate adjustment mechanism 27 is positioned upstream of the heat exchanger 24a in a flow direction of the heat medium. Specifically, the flow rate adjustment mechanism 27 is positioned at a branching point (upstream end of the wall 60) between the main channel 24b and the bypass channel 24c. The flow rate adjustment mechanism 27 disposed at such a position reliably stops the supply of the heat medium to the heat exchanger 24a.

In this embodiment, the flow rate adjustment mechanism 27 is activated by the actuator 26. The actuator 26 is controlled by the controller 16. This configuration enables remote activation of the flow rate adjustment mechanism 27. The configuration of the flow rate adjustment mechanism 27 is not limited. The flow rate adjustment mechanism 27 may include a slide valve, a butterfly valve, a two-way valve, or a three-way valve.

Figure 2:
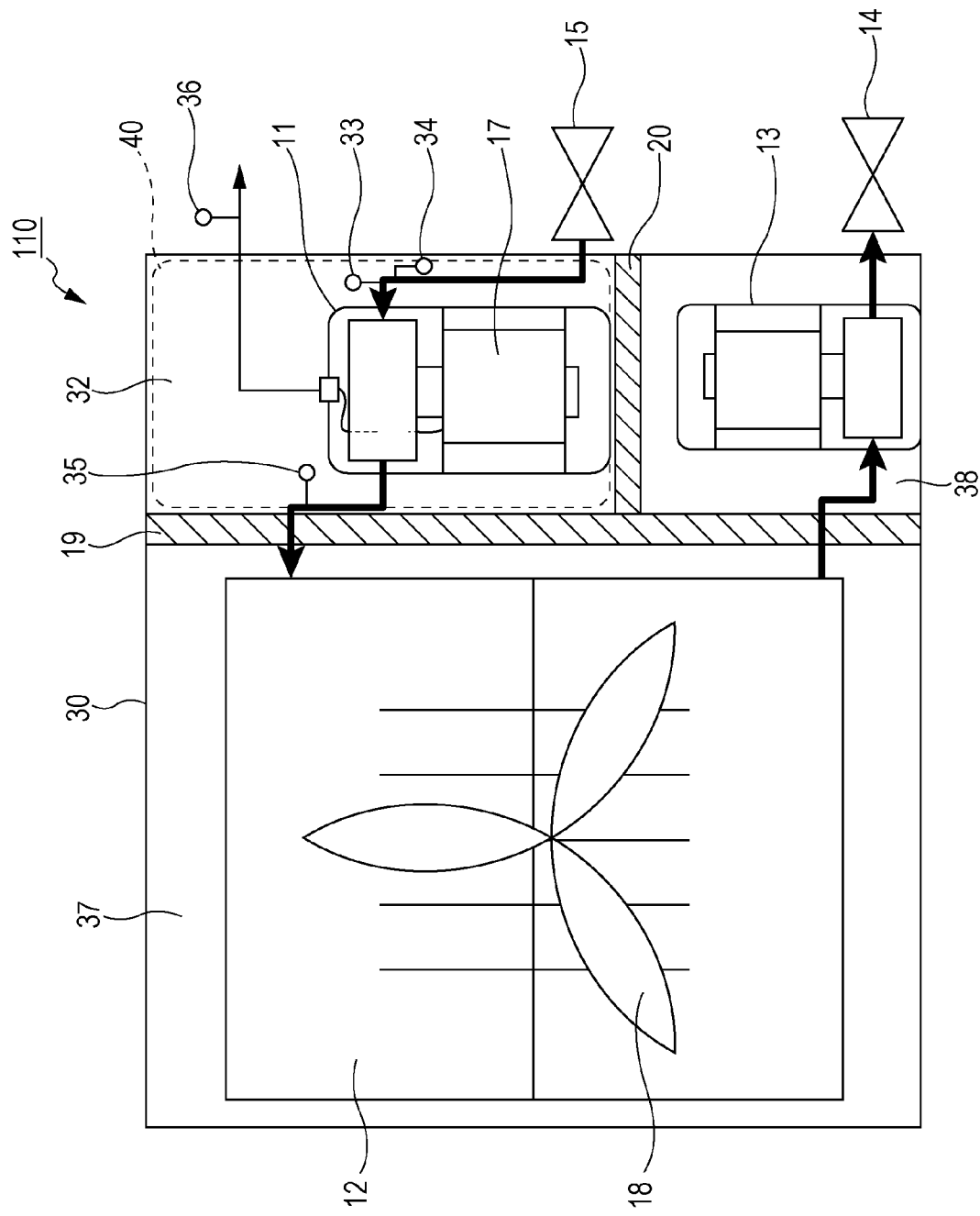
FIG. 2 is a view illustrating a configuration of an air cooling unit in the thermal electric power generator illustrated in FIG. 1.

As illustrated in FIG. 2, the expander 11, the condenser 12, and the pump 13 constitute an air cooling unit 110. The air cooling unit 110 includes a casing 30. The expander 11, the condenser 12, and the pump 13 are disposed in the casing 30. The air cooling unit 110 includes connectors 14 and 15. The connector 14 is connected to an inlet of the evaporator 24 (specifically, an inlet of the heat exchanger 24a) through a pipe. The connector 15 is connected to an outlet of the evaporator 24 (specifically, an outlet of the heat exchanger 24a) through a pipe. The working fluid is sent from the air cooling unit 110 to the evaporator 24 through the connector 14. The working fluid receives the thermal energy at the evaporator 24 and evaporates. The working fluid in gaseous form returns to the air cooling unit 110 through the connector 15. The connectors 14 and 15 are optional components.

The expander 11 extracts power from the working fluid heated at the evaporator 24. Specifically, the expander 11 expands the working fluid to convert expansion energy of the working fluid into rotation power. An electric generator 17 is connected to a rotation shaft of the expander 11. The expander 11 activates the electric generator 17. The electric generator 17 converts the power extracted by the expander 11 to electric power. The expander 11 is a positive displacement expander or a turbo expander, for example. Examples of the positive displacement expander include a scroll expander, a rotary expander, a screw expander, and a reciprocating expander. The turbo expander is an expansion turbine.

The expander 11 is preferably a positive displacement expander. The positive displacement expander commonly exhibits a high expander efficiency in a wide range of a rotation frequency compared with the turbo expander. The positive displacement expander is able to operate at a rotation frequency less than half a rated rotation frequency with the high expander efficiency being maintained. In other words, the amount of electric power generation is able to be reduced to a value less than half a rated electric power generation amount with the high efficiency being maintained. Since the positive displacement expander has such a property, employment of the positive displacement expander enables the amount of electric power generation to increase or decrease with the high efficiency being maintained.

In this embodiment, the electric generator 17 is disposed in a sealed container of the expander 11. The expander 11 is a hermetic expander. However, the expander 11 may be a semi-hermetic expander or an open expander.

The condenser 12 cools the working fluid having a reduced pressure reduced in the expander 11 such that the working fluid is condensed. The condenser 12 may be an air-cooing heat exchanger that cools the working fluid with air. Examples of the air-cooling heat exchanger include a fin tube heat exchanger. The fin tube heat exchanger contributes to a reduction in cost of the air cooling unit 110 and a reduction in setting area. A configuration of the condenser 12 is properly determined depending on the setting place of the air cooling unit 110 and the amount of heat supplied from the heat source 104 to the thermal electric power generator 100. If the condenser 12 is an air-cooling condenser, cooling water is not required, and thus accompanying equipment such as a water pipe is unnecessary. This simplifies installation work of the thermal electric power generator 100 and also saves the trouble of maintenance.

However, the condenser 12 is not limited to the air-cooling heat exchanger. The condenser 12 may be a liquid-cooling (water-cooling) heat exchanger that cools the working fluid with a liquid such as water, for example. A plate heat exchanger is well known as such a heat exchanger. If the condenser 12 is a water-cooling condenser, a condensation temperature is low compared with a case in which the condenser 12 is the air-cooling condenser. Thus, the electric power generation capacity of the thermal electric power generator 100 increases, resulting in high electric power generation efficiency.

The air cooling unit 110 further includes a fan 18 that supplies air to the condenser 12. The fan 18 is also disposed in the casing 30. The fan 18 in operation supplies air to the condenser 12. The fan 18 may be a propeller fan.

The pump 13 takes in the working fluid cooled in the condenser 12 and applies pressure to the working fluid, and then ejects the pressurized working fluid to the evaporator 24. The pump 13 may be a commonly used positive displacement pump or a commonly used turbo pump. Examples of the positive displacement pump include a piston pump, a gear pump, a vane pump, and a rotary pump. Examples of the turbo pump include a centrifugal pump, a mixed flow pump, and an axial flow pump.

The controller 16 controls the flow rate adjustment mechanism 27, the pump 13, the electric generator 17, and the fan 18, for example. The controller 16 controls the overall operation of the thermal electric power generator 100. A DSP (Digital Signal Processor) including an A/D conversion circuit, input and output circuits, an arithmetic circuit, and a memory may be used as the controller 16. The controller 16 stores a program for properly operating the thermal electric power generator 100.

The casing 30 is a container for housing the components such as the expander 11, the condenser 12, and the pump 13. The casing 30 is made of metal, for example. The casing 30 has a cuboidal shape, for example. The casing 30 has two side surfaces facing each other. Each side surface has an opening through which air is introduced into and expelled from the casing 30.

The air cooling unit 110 further includes a partition 19 and a partition 20. The partitions 19 and 20 divide an internal space of the casing 30 into an expander housing 32, a condenser housing 37, and a pump housing 38. The temperature in the expander housing 32 is the highest among the temperatures in the expander housing 32, the condenser housing 37, and the pump housing 38. The temperature in the expander housing 32 increases to 200° C., for example. Since the partitions 19 and 20 prevent heat transmission from the expander 11, the temperatures in the condenser housing 37 and the pump housing 38 are lower than the temperature in the expander housing 32 by a few tens of degrees.

The thermal electric power generator 100 further includes a detector 33 for determining an operation state of the thermal electric power generator 100. The controller 16 receives a detection signal from the detector 33. If a detection result from the detector 33 exceeds a predetermined threshold, the controller 16 determines that the thermal electric power generator 100 has had a failure. Then, the controller 16 controls the flow rate adjustment mechanism 27 to reduce or stop the supply of the heat medium to the heat exchanger 24a. This configuration enables the thermal electric power generator 100 to operate in such a way that the temperature of the working fluid in the heat exchanger 24a remains lower than the thermal decomposition temperature of the working fluid. If the temperature of the working fluid exceeds or almost exceeds the thermal decomposition temperature, the controller 16 controls the flow rate adjustment mechanism 27 such that the heat medium flows through the bypass channel 24c. Thus, thermal decomposition of the working fluid does not occur at the heat exchanger 24a.

The detector 33 may detect the temperature of the working fluid at the inlet of the expander 11 (or an outlet of the heat exchanger 24a). In other words, the detector 33 may include a temperature sensor. The temperature of the working fluid at the inlet of the expander 11 is the highest in the thermal electric power generator 100. The detection of the temperature of the working fluid at the inlet of the expander 11 enables prevention of the thermal decomposition of the working fluid. The detector 33 including the temperature sensor enables behavior monitoring of the thermal electric power generator 100 and reliable detection of a failure of the thermal electric power generator 100. The detector 33 including the temperature sensor is simple and cheap. If the detector 33 includes the temperature sensor, the above-described threshold (threshold temperature) may be set to be lower than the thermal decomposition temperature of the working fluid by about 50° C.

The thermal electric power generator 100 may include a detector 34 for determining an operation state of the thermal electric power generator 100. The detector 34 determines a pressure of the working fluid at the inlet of the expander 11. The detector 34 may include a pressure sensor. If the pressure of the working fluid at the inlet of the expander 11 exceeds a threshold, the thermal electric power generator 100 is determined to have had a failure. The controller 16 controls the flow rate adjustment mechanism 27 to reduce or stop the supply of the heat medium to the heat exchanger 24a. The threshold (threshold pressure) is properly set depending on the kind of the working fluid, for example. The detector 34 including the pressure sensor enables behavior monitoring of the thermal electric power generator 100 and reliable detection of a failure of the thermal electric power generator 100.

Alternatively, the thermal electric power generator 100 may include the detector 34 and a detector 35 for determining the operation state of the thermal electric power generator 100. The detector 34 determines a pressure of the working fluid at the inlet of the expander 11. The detector 35 determines a pressure of the working fluid at the outlet of the expander 11. The detectors 34 and 35 each may include a pressure sensor. A difference between the pressure of the working fluid at the inlet of the expander 11 and the pressure of the working fluid at the outlet of the expander 11 is determined by the detectors 34 and 35. If the pressure difference exceeds a predetermined threshold, the controller 16 controls the flow rate adjustment mechanism 27 to reduce or stop the supply of the heat medium to the heat exchanger 24a. The detectors 34 and 35 enable behavior monitoring of the thermal electric power generator 100 and reliable detection of a failure of the thermal electric power generator 100.

Alternatively, the thermal electric power generator 100 may include a detector 36 for determining the operation state of the thermal electric power generator 100. The detector 36 determines the amount of electric power generated by the electric generator 17. The detector 36 may include a wattmeter. If the amount of generated electric power exceeds a predetermined threshold, the controller 16 controls the flow rate adjustment mechanism 27 to reduce or stop the supply of the heat medium to the heat exchanger 24a. The generated electric power is a reliable parameter, and thus a failure of the thermal electric power generator 100 is promptly detected by using the detector 36.

At least one of the detector 33, the detector 34, the combination of the detector 34 and the detector 35, and the detector 36 is used to monitor the behavior of the thermal electric power generator 100, enabling detection of a failure of the thermal electric power generator 100.

Failure of the thermal electric power generator 100 may result from a malfunction of the pump, which prevents circulation of the working fluid, a malfunction of an inverter, which prevents rotation control of the expander 11, or a malfunction of the fan 18 of the air cooling unit 110, which prevents sufficient condensation, for example. When such a failure occurs, the heat medium having a high temperature, particularly, a temperature higher than the thermal decomposition temperature of the working fluid is continuously supplied from the heat source 104 to the heat exchanger 24a. If the heat exchanger 24a is continuously exposed to such a heat medium, the working fluid may be subjected to thermal decomposition. In this embodiment, if the thermal electric power generator 100 is determined to have had a failure, the flow rate adjustment mechanism 27 is controlled to protect the heat exchanger 24a from heat. This prevents overheating of the working fluid in the heat exchanger 24a and reduces the thermal decomposition of the working fluid.

Next, some modifications of the air cooling unit applicable to the thermal electric power generator 100 are described.

First Modification

Figure 3:
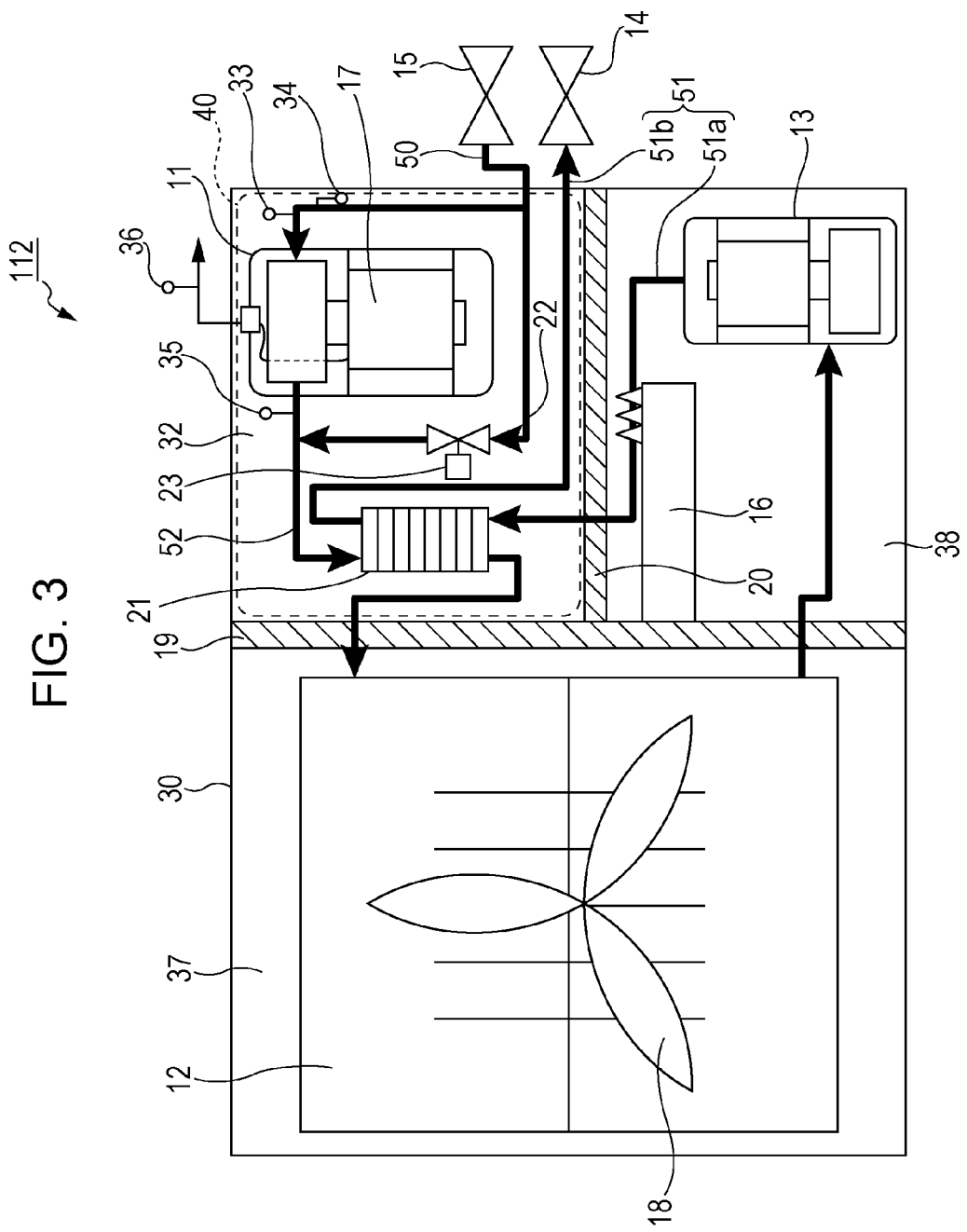
FIG. 3 is a view illustrating a configuration of an air cooling unit according to a first modification.

As illustrated in FIG. 3, an air cooling unit 112 of a first modification further includes a reheater 21, an expander bypass channel 22, and a valve 23 in addition to the components of the air cooling unit 110 described with reference to FIG. 2. The reheater 21, the expander bypass channel 22, and the valve 23 are disposed in the casing 30. The expander bypass channel 22 extends so as to allow the working fluid to bypass the expander 11. Specifically, the expander bypass channel 22 extends so as to connect a channel 50, through which the working fluid flows to the expander 11, and a channel 52, through which the working fluid expelled from the expander 11 flows, to each other at an outside of the expander 11 to bypass the expander 11. The expander bypass channel 22 allows the working fluid to flow into the reheater 21 without flowing through the expander 11. If the air cooling unit 112 does not include the reheater 21, the working fluid may be supplied to the condenser 12 through the expander bypass channel 22. The valve 23 is disposed in the expander bypass channel 22. The valve 23 adjusts the flow rate of the working fluid in the expander bypass channel 22. The valve 23 may be a flow rate control valve or an on-off valve.

The reheater 21 constitutes a portion of the channel 52 through which the working fluid expelled from the expander 11 is supplied to the condenser 12. The reheater 21 also constitutes a portion of a channel 51 through which the working fluid expelled from the pump 13 is supplied to the evaporator 24. In the reheater 21, heat is transferred between the working fluid to be supplied from the expander 11 to the condenser 12 and the working fluid to be supplied from the pump 13 to the evaporator 24. The temperature of the working fluid expelled from the expander 11 is 100 to 150° C., for example. In the reheater 21, the thermal energy of the working fluid expelled from the expander 11 is transferred to the working fluid expelled from the pump 13. This reduces cooling energy required at the condenser 12 and heating energy required at the evaporator 24. As a result, the condenser 12 and the evaporator 24 can be downsized.

In this embodiment, the reheater 21 is disposed in the expander housing 32. The reheater 21 disposed in the expander housing 32 is able to directly recover the heat in the expander housing 32 or indirectly recover the heat in the expander housing 32 through the pipe connected to the reheater 21. The working fluid expelled from the pump 13 has a low temperature of 20 to 50° C., for example. The temperature of the working fluid expelled from the expander 11 is 100 to 150° C., for example. The temperature of the working fluid expelled from the pump 13 is lower than that of the working fluid expelled from the expander 11. In addition, the temperature of the working fluid flowing from the reheater 21 is lower than that of the working fluid expelled from the expander 11. Thus, the thermal energy emitted from the expander 11 is recovered by the thermal electric power generator 100 through the reheater 21.

The expander bypass channel 22 and the valve 23 are also disposed in the expander housing 32. The temperature of the working fluid flowing through a portion of the expander bypass channel 22 positioned upstream of the valve 23 is substantially equal to the temperature of the working fluid at the inlet of the expander 11, which is 200° C., for example. Since the expander bypass channel 22 and the valve 23 are disposed in the expander housing 32, heat is unlikely to be transferred from the working fluid flowing through an upstream portion of the expander bypass channel 22, which has a high temperature, to the components such as the condenser 12 and the pump 13, which have low temperatures.

In this embodiment, the expander 11, the reheater 21, the expander bypass channel 22, and the valve 23 are disposed in one space (in the expander housing 32), eliminating the need of covering the components individually by an insulator. The expander housing 32 may be covered by an insulator 40 so as to be insulated. This simplifies the production process of the air cooling unit 112. The expander 11, the reheater 21, the expander bypass channel 22, and the valve 23 may be individually covered by an insulator.

In this modification, the controller 16 is disposed in the pump housing 38. The temperature of the pump housing 38 is lower than that of the expander housing 32 by 10° C., which is an advantageous environment for the controller 16. The controller 16 disposed in the pump housing 38 is unlikely to be overheated.

The working fluid at the outlet of the pump 13 cools the controller 16 disposed in the pump housing 38. The controller 16 typically includes a control electric circuit. The electric circuit generates heat and the controller 16 needs to be cooled. The controller 16 may be cooled with air. The controller 16 may be cooled by the working fluid expelled from the pump 13 as in this modification. The working fluid at the outlet of the pump 13 is in liquid form and has a temperature of 20 to 50° C., for example, although the form and the temperature thereof vary depending on a surrounding environment and operational conditions of the thermal electric power generator 100. The working fluid in such a state is advantageous in the cooling of the controller 16. Specifically, a portion (channel 51a) of the channel 51

(pipes), which is connected to the outlet of the pump 13, is in contact with the controller 16 (heat generating portion of the controller 16) so as to cool the controller 16. This configuration prevents the controller 16 from being overheated.

In this modification, the channel 50 (first channel) for connecting the expander 11 to the evaporator 24 extends through the expander housing 32 to the outside of the casing 30. The connector 15 for connecting the channel 50 to the evaporator 24 is positioned outside the casing 30. A portion (channel 51b) of the channel 51 (second channel) for connecting the pump 13 to the evaporator 24 extends to the outside of the casing 30 through the expander housing 32. The connector 14 for connecting the channel 51 to the evaporator 24 is positioned outside the casing 30. The connectors 14 and 15 are attached the casing 30 at positions corresponding to the expander housing 32, for example. This configuration enables the channels 50 and 51b (pipes), through which the working fluid having a relatively high temperature flows, to be housed in the expander housing 32. As a result, heat is unlikely to be transferred to an air passage for the condenser 12 and the pump 13.

An open degree of the valve 23 is preferably adjustable. A change in the open degree of the valve 23 changes the flow rate of the working fluid that bypasses the expander 11. The valve 23 is opened when the working fluid at the outlet of the evaporator 24 is in a transitional condition and the cycle is unstable. The cycle is unstable at the time of startup and at the time of shutdown of the thermal electric power generator 100, for example. The opening timing of the valve 23 is not limited to such a transitional period. The valve 23 may be opened when the state of the working fluid at the outlet of the evaporator 24 is stable.

If the thermal electric power generator 100 is determined to have had a failure, the controller 16 opens the valve 23 such that the working fluid flows through the expander bypass channel 22. As a result, the working fluid flows through the expander bypass channel 22. This reduces the excess flow of the working fluid to the expander 11 and enables the thermal electric power generator 100 to stop safely.

Second Modification

Figure 4:
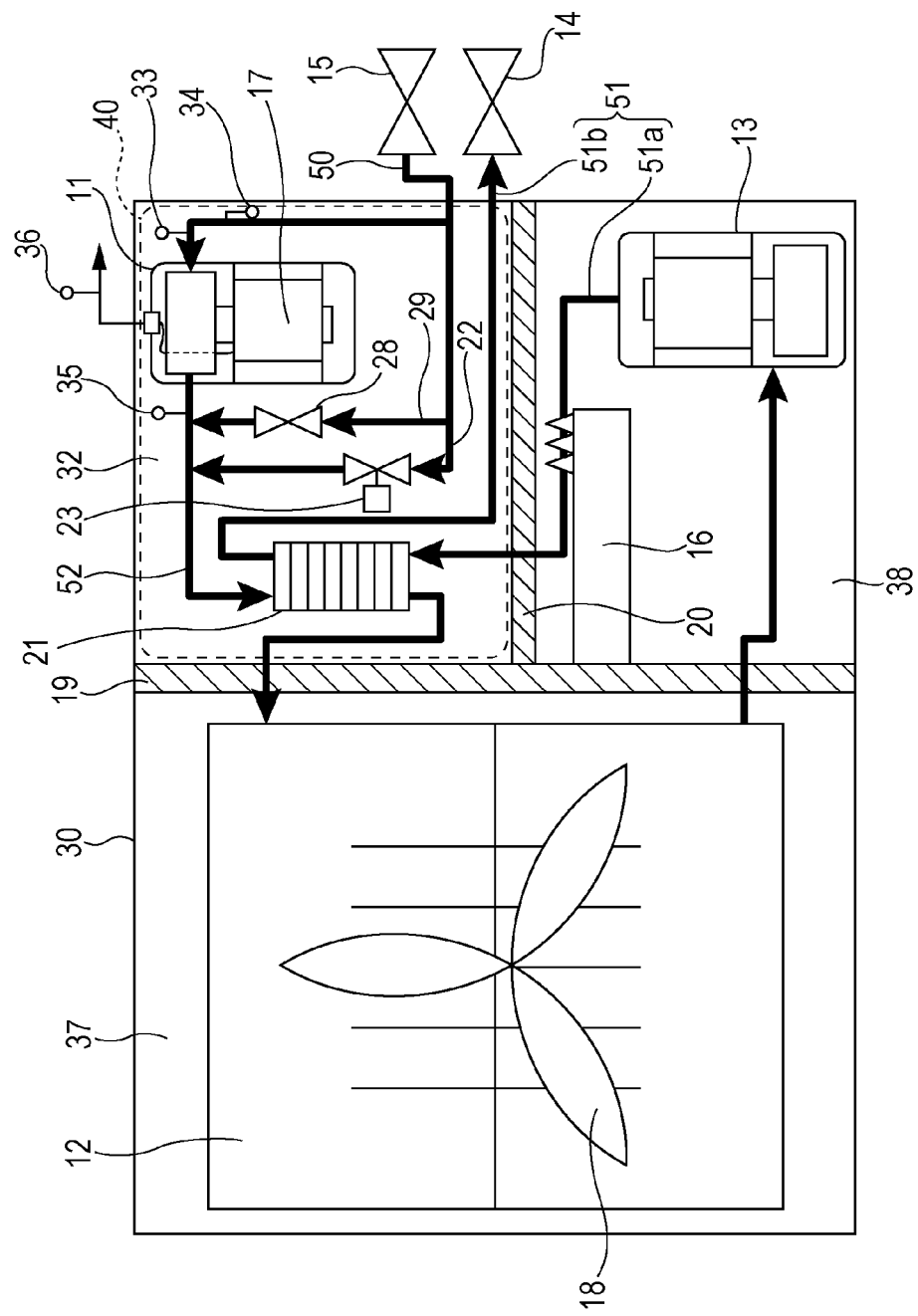
FIG. 4 is a view illustrating a configuration of an air cooling unit according to a second modification.

As illustrated in FIG. 4, an air cooing unit 114 of this modification includes an additional expander bypass channel 29 and a second valve 28 in addition to the components of the air cooling unit 112 in the first modification. The additional expander bypass channel 29 extends in parallel with the expander bypass channel 22 and allows the working fluid to flow into the reheater 21 without passing through the expander 11. The second valve 28 may be a relief valve. Specifically, if a difference between the pressure at the inlet of the expander 11 and the pressure at the outlet of the expander 11 exceeds a threshold, i.e., if a failure occurs in the thermal electric power generator 100, the second valve 28 opens. This configuration reduces an increase in pressure inside the thermal electric power generator 100 in the event of a failure of the thermal electric power generator 100. The second valve 28 functions as a safety valve that mechanically opens or closes depending on a predetermined threshold pressure without driving power. This configuration enables the second valve 28 to reliably function in a situation with no access to the electric power due to power outage, for example, and enables the thermal electric power generator 100 to stop safely.

Second Embodiment

Figure 5:
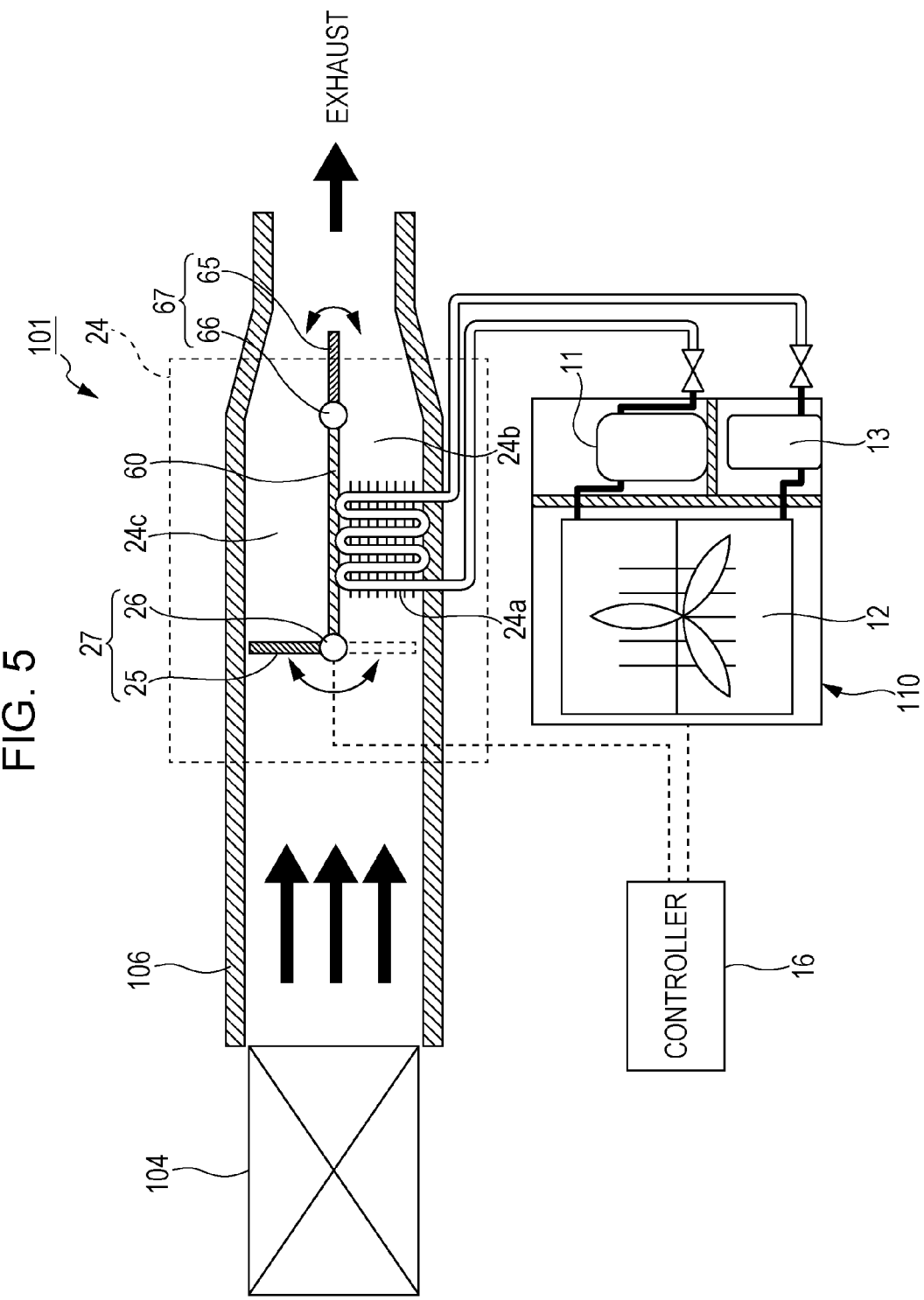
FIG. 5 is a view illustrating a configuration of a thermal electric power generator according to a second embodiment.

As illustrated in FIG. 5, a thermal electric power generator 101 of a second embodiment includes a second flow rate adjustment mechanism 67 in addition to the components of the thermal electric power generator 100 in the first embodiment. The second flow rate adjustment mechanism 67 is included in the evaporator 24, for example.

In this embodiment, the second flow rate adjustment mechanism 67 is disposed downstream of the heat exchanger 24a in the flow direction of the heat medium. Specifically, the second flow rate adjustment mechanism 67 is positioned at a meeting point (downstream end of the wall 60) between the main channel 24b and the bypass channel 24c. The second flow rate adjustment mechanism 67, which is disposed in addition to the flow rate adjustment mechanism 27 (first flow rate adjustment mechanism 27) described in the first embodiment, prevents backflow of the heat medium from the downstream side of the heat exchanger 24a toward the heat exchanger 24a. As a result, unnecessary heat is unlikely to be applied to the heat exchanger 24a. The first flow rate adjustment mechanism 27 and the second flow rate adjustment mechanism 67 may be controlled to be closed, i.e., the first and second flow rate adjustment mechanisms 27 and 67 may be controlled to block the heat medium from entering the main channel 24b, for maintenance of the heat exchanger 24a. The heat exchanger 24a may be removed for maintenance.

The configuration of the second first flow rate adjustment mechanism 67 is not particularly limited as in the first flow rate adjustment mechanism 27. In this embodiment, the second flow rate adjustment mechanism 67 includes a damper 65 and an actuator 66. The second flow rate adjustment mechanism 67 is also electrically controlled by the controller 16. The damper 65 is linked to the actuator 66 and is moved by the actuator 66.

Third Embodiment

Figure 6:
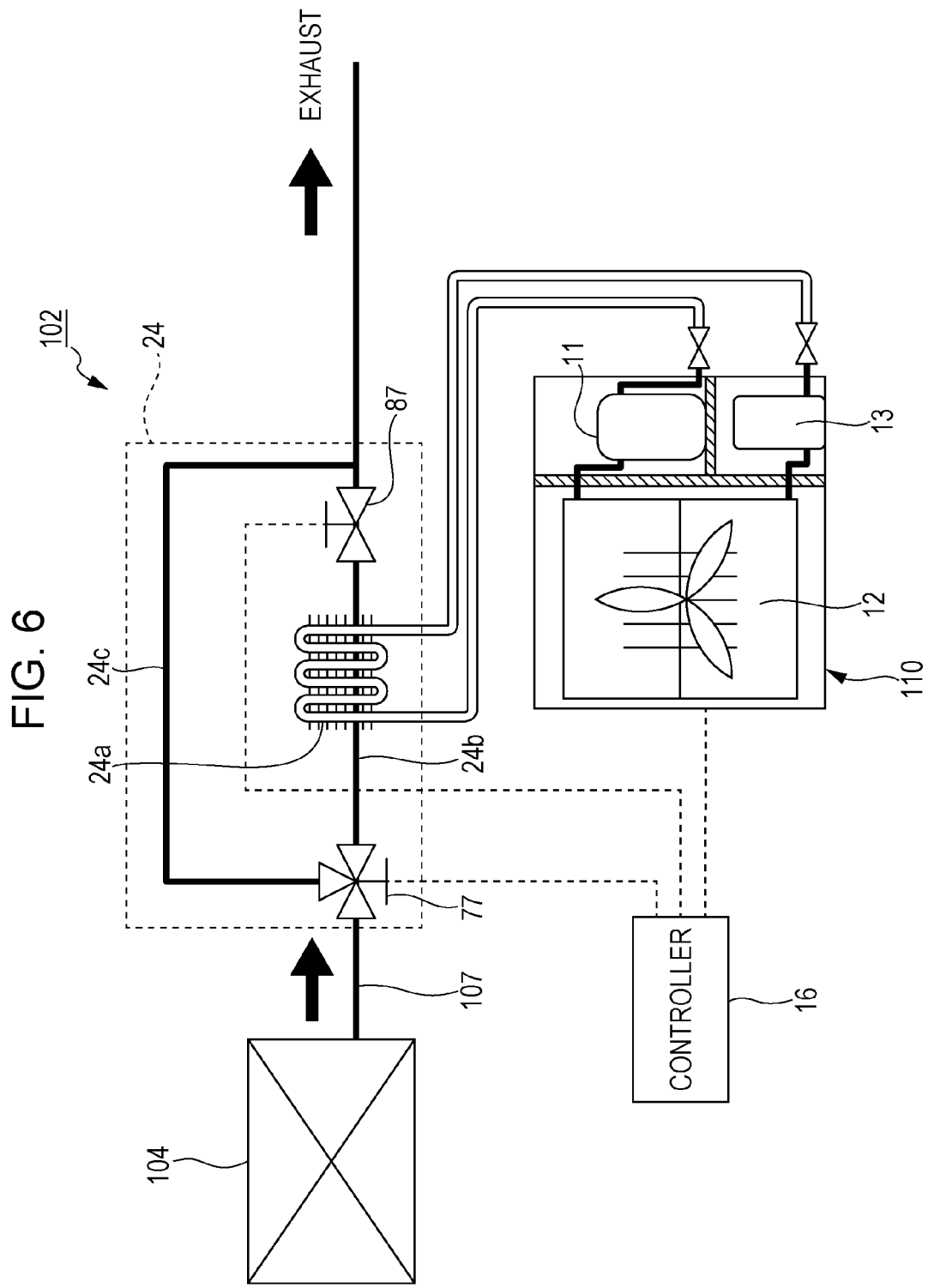
FIG. 6 is a view illustrating a configuration of a thermal electric power generator according to a third embodiment.
Figure 7:
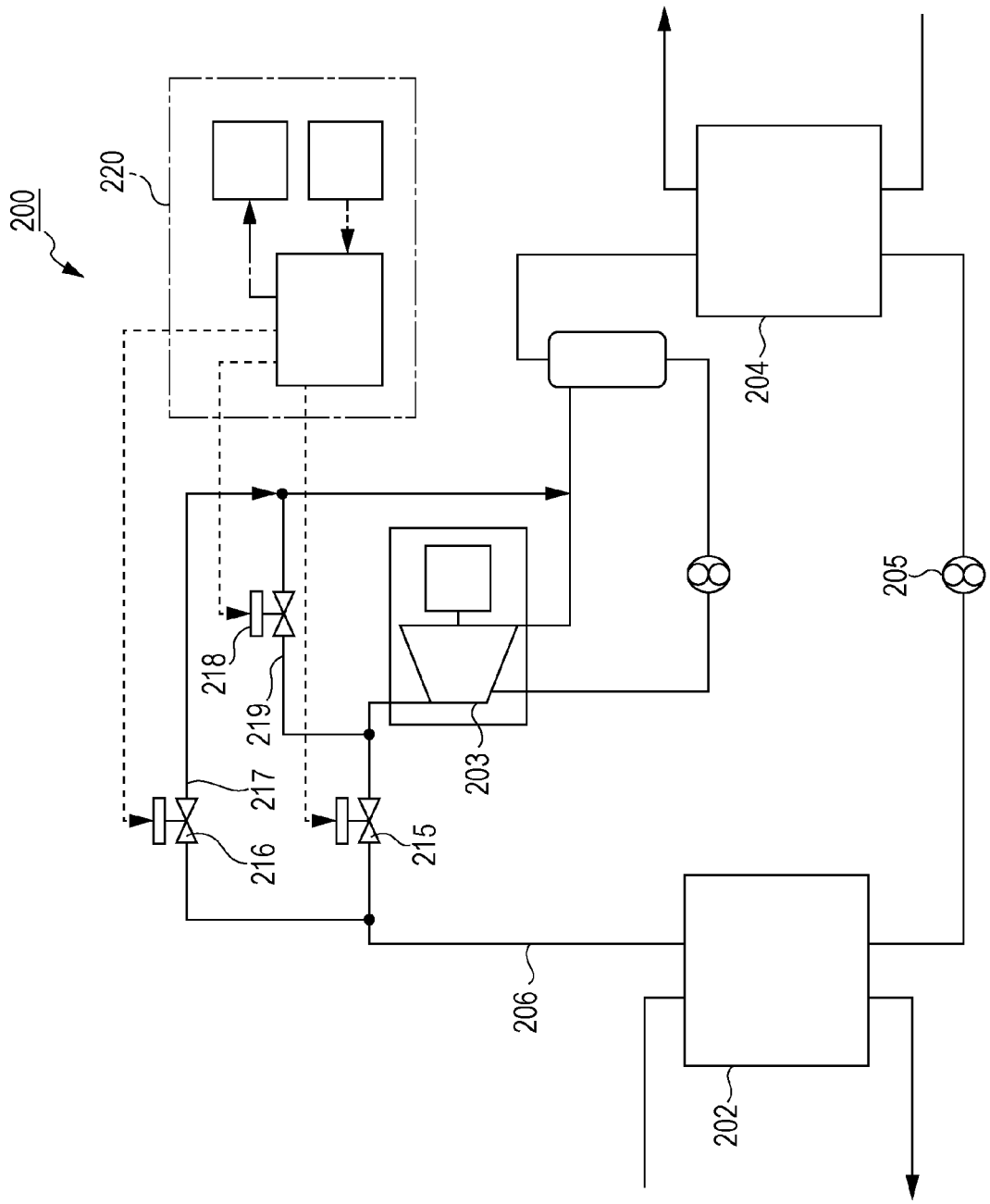
FIG. 7 is a view illustrating a configuration of a conventional electric power generator.

As illustrated in FIG. 6, in a thermal electric power generator 102 of a third embodiment, the bypass channel 24c is constituted by a by-pass pipe. The heat medium is supplied from the heat source 104 to the thermal electric power generator 102 through a pipe 107. The working fluid receives the heat from the heat medium flowing through the main channel 24b at the heat exchanger 24a. The heat exchanger 24a may be a shell tube heat exchanger or a double pipe heat exchanger, for example.

In this embodiment, a flow rate adjustment mechanism 77 is disposed at a branching point between the main channel 24b and the bypass channel 24c. The flow rate adjustment mechanism 77 is a three-way valve. The flow rate adjustment mechanism 77 may include a flow rate adjustment valve. In this case, the flow rate adjustment mechanism 77 has a distribution function described in the above-described embodiment. In addition, a second flow rate adjustment mechanism 87 as an on-off valve is disposed downstream of the heat exchanger 24a so as to prevent backflow of the heat medium from the downstream side of the heat exchanger 24a toward the heat exchanger 24a. Specifically, the on-off valve is disposed in the main channel 24b at a position upstream of the meeting point between the main channel 24b and the bypass channel 24c.

Others

The bypass channel 24c in the evaporator 24 is an optional component. Similarly, the flow rate adjustment mechanism 27, 67, 77, and 87 in the evaporator 24 are optional components. Such components may be disposed separately from the evaporator 24.

The controller 16 is not limited to the DSP and may be any controller that has a control function. The controller 16 includes a processing unit (not illustrated) and a storage (not illustrated) that stores a control program. Examples of the processing unit include a MPU and a CPU. Examples of the storage include a memory. The control program controls the flow rate adjustment mechanism 27, the pump 13, the electric generator 17, and the fan 18 via the processing unit. The controller 16 may include a single controller with a centralized control or may include a plurality of controllers interacting with each other with decentralized controls.

The techniques disclosed herein are advantageously used in the thermal electric power generators that recovers waste heat energy released from a facility such as a plant or a firing furnace to generate electric power. In addition, the techniques disclosed herein are applicable not only to the apparatuses that recover the waste heat energy but also to electric power generators that use heat sources such as a boiler.

What is claimed is:

1. A thermal electric power generator comprising:
    an evaporator that includes a heat exchanger that allows heat exchange between a heat medium supplied from a heat source and an organic working fluid;
    an expander that extracts power from the organic working fluid heated at the evaporator;
    an electric power generator that converts the power extracted by the expander to electric power;
    a condenser that cools the organic working fluid having a reduced pressure reduced in the expander; and
    a pump that takes in the organic working fluid cooled by the condenser and ejects the organic working fluid to the evaporator;
    a bypass channel that allows the heat medium to bypass the heat exchanger;
    a first damper that is disposed upstream of the heat exchanger in a flow direction of the heat medium; and
    a controller including a processor and a memory storing a program,
    wherein the program, when executed by the processor, causes the controller to perform:
        obtaining, by a sensor, an information indicating at least one selected from the group consisting of a pressure of the organic working fluid, a temperature of the organic working fluid and an amount of electric power generated by the electric generator;
        supplying a part of the heat medium to the heat exchanger so that the temperature of the organic working fluid in the heat exchanger remains lower than a thermal decomposition temperature of the organic working fluid based on the information; and
        supplying a remaining heat medium to the bypass channel.

2. The thermal electric power generator according to claim 1, wherein the information indicates a temperature of the organic working fluid at an inlet of the expander.

3. The thermal electric power generator according to claim 1, wherein the information indicates a pressure of the organic working fluid at an inlet of the expander.

4. The thermal electric power generator according to claim 1, wherein the information indicates a difference between a pressure of the organic working fluid at an inlet of the expander and a pressure of the organic working fluid at an outlet of the expander.

5. The thermal electric power generator according to claim 1, wherein the information indicates the amount of electric power generated by the electric generator.

6. The thermal electric power generator according to claim 1, further comprising a first actuator connected to the first damper,
    wherein the program further causes the controller to cause the first actuator to move the first damper.

7. The thermal electric power generator according to claim 1, further comprising:
    a second damper that is disposed downstream of the heat exchanger in the flow direction of the heat medium,
    wherein the program further causes the controller to cause the second damper to move to prevent backflow of the heat medium from a downstream side of the heat exchanger toward the heat exchanger.

8. The thermal electric power generator according to claim 7, further comprising a second actuator connected to the second damper,
    wherein the program further causes the controller to cause the second actuator to move the second damper.

9. The thermal electric power generator according to claim 1, wherein the heat exchanger allows direct heat exchange between the heat medium and the organic working fluid.

10. The thermal electric power generator according to claim 1, wherein the condenser cools the organic working fluid with air.

11. The thermal electric power generator according to claim 1, wherein the condenser cools the organic working fluid with water.

12. The thermal electric power generator according to claim 1, wherein the evaporator allows the heat medium having a temperature higher than the thermal decomposition temperature of the organic working fluid to flow therethrough.

13. The thermal electric power generator according to claim 1, further comprising:
    an expander bypass channel that allows the organic working fluid to bypass the expander; and
    a valve disposed in the expander bypass channel,
    wherein the program further causes the controller to perform opening the valve such that the organic working fluid flows through the expander bypass channel if the thermal electric power generator is determined to have had a failure.

14. A thermal electric power generator comprising:
    an evaporator that includes a heat exchanger that allows heat exchange between a heat medium supplied from a heat source and an organic working fluid;
    an expander that extracts power from the organic working fluid heated at the evaporator;
    an electric power generator that converts the power extracted by the expander to electric power;
    a condenser that cools the organic working fluid having a reduced pressure reduced in the expander; and
    a pump that takes in the organic working fluid cooled by the condenser and ejects the organic working fluid to the evaporator;
    a bypass channel that allows the heat medium to bypass the heat exchanger;
    a damper that is disposed upstream of the heat exchanger in a flow direction of the heat medium; and
    a controller including a processor and a memory storing a program, wherein the program, when executed by the processor, causes the controller to perform:
  determining a pressure of the organic working fluid by a sensor; and
  supplying, based on the pressure, a part flow rate of the heat medium to the heat exchanger and a remaining part of the heat medium to the bypass channel by moving the damper.

15. The thermal electric power generator according to claim 14, wherein the determining the pressure of the organic working fluid comprises determining a pressure of the organic working fluid at an inlet of the expander.

16. The thermal electric power generator according to claim 15, wherein the program further causes the controller to perform:
  determining a pressure of the organic working fluid at an outlet of the expander by a sensor, and
  wherein the supplying the part the heat medium to the heat exchanger and the remaining part of the heat medium to the bypass channel is based on the pressure of the organic working fluid at the inlet and the outlet of the expander.

17. The thermal electric power generator according to claim 16,
  wherein the supplying the part of the heat medium to the heat exchanger and the remaining part of the heat medium to the bypass channel is based on a difference between the pressure of the organic working fluid at the inlet of the expander and the pressure of the organic working fluid at the outlet of the expander.

18. A method for operating a thermal electric power generator, the thermal electric power generator including:
  an evaporator that includes a heat exchanger that allows heat exchange between a heat medium supplied from a heat source and an organic working fluid;
  an expander that extracts power from the organic working fluid heated at the evaporator;
  an electric power generator that converts the power extracted by the expander to electric power;
  a condenser that cools the organic working fluid having a reduced pressure reduced in the expander; and
  a pump that takes in the organic working fluid cooled by the condenser and ejects the organic working fluid to the evaporator;
  a bypass channel that allows the heat medium to bypass the heat exchanger;
  a first damper that is disposed upstream of the heat exchanger in a flow direction of the heat medium, the method comprising:
  obtaining, by a sensor, an information indicating at least one selected from the group consisting of a pressure of the organic working fluid, a temperature of the organic working fluid and an amount of electric power generated by the electric generator;
  supplying a part of the heat medium to the heat exchanger so that the temperature of the organic working fluid in the heat exchanger remains lower than a thermal decomposition temperature of the organic working fluid based on the information; and
  supplying a remaining heat medium to the bypass channel.

* * * * *